United States Patent [19]
Watts

[11] Patent Number: 5,193,584
[45] Date of Patent: Mar. 16, 1993

[54] SPOOL VALVE AND METHOD OF MAKING THE SAME

[75] Inventor: Thomas A. Watts, Ames, Iowa
[73] Assignee: Sauer Inc., Wilmington, Del.
[21] Appl. No.: 839,358
[22] Filed: Feb. 20, 1992
[51] Int. Cl.$^5$ ............................ F16K 3/24; F16K 3/32
[52] U.S. Cl. ............................ 137/625.33; 137/625.3; 251/205
[58] Field of Search ............... 251/205; 137/625.33, 137/625.3, 625.69

[56] References Cited

U.S. PATENT DOCUMENTS 4,981,159  1/1991  Christensen et al. ........... 137/625.69

FOREIGN PATENT DOCUMENTS 855541  12/1960  United Kingdom ............... 251/205

*Primary Examiner*—Arnold Rosenthal
*Attorney, Agent, or Firm*—Zarley, McKee, Thomte, Voorhees & Sease

[57] ABSTRACT

A spool valve has a valve body with an elongated cylindrical bore therein. Fluid passageways extend in a radial direction through the valve body and communicate with the interior bore. A peripheral port edge is defined by the intersection of the bore and the passages. A cylindrical valve spool is slidably mounted in the bore to close and open the passageways with respect to the bore. The valve spool has a cylindrical outer surface and at least one planar circular surface with a peripheral metering edge therebetween. The peripheral metering edge has a plurality of tapered notches therein which are adapted at times to overlap the peripheral port edge to permit fluid flow between the bore and the passages. The method of this invention involves creating the notches in the valve spool by positioning a knurling tool at an angle with respect to the peripheral metering edge of the spool, rotating the knurling tool with respect to the spool to permit the spaced longitudinal V-shaped projections of the knurling tool to impress in the spool the desired tapered notches.

2 Claims, 2 Drawing Sheets

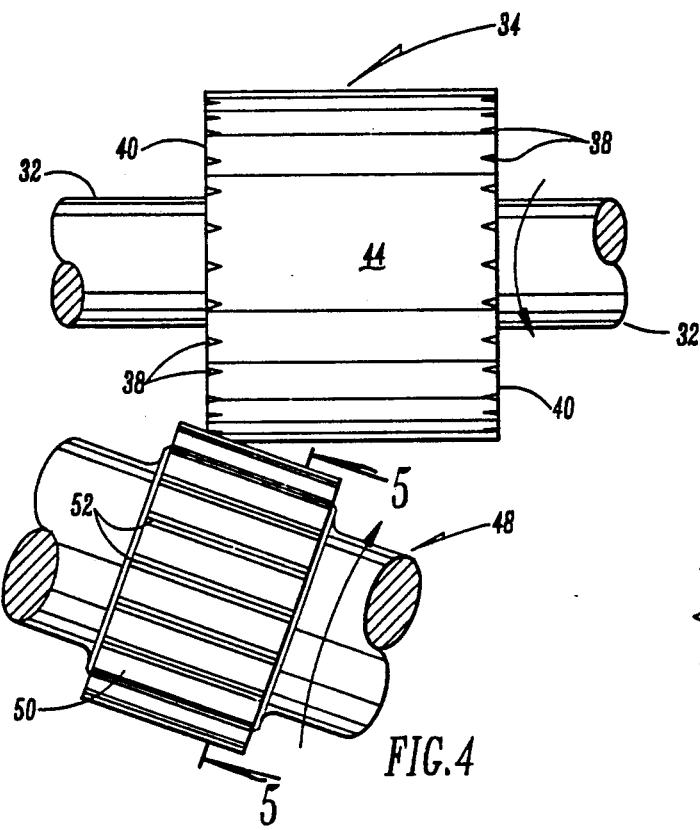
FIG. 4
FIG. 5
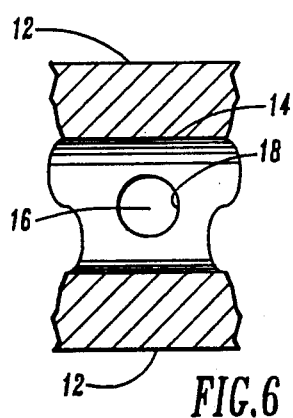
FIG. 6
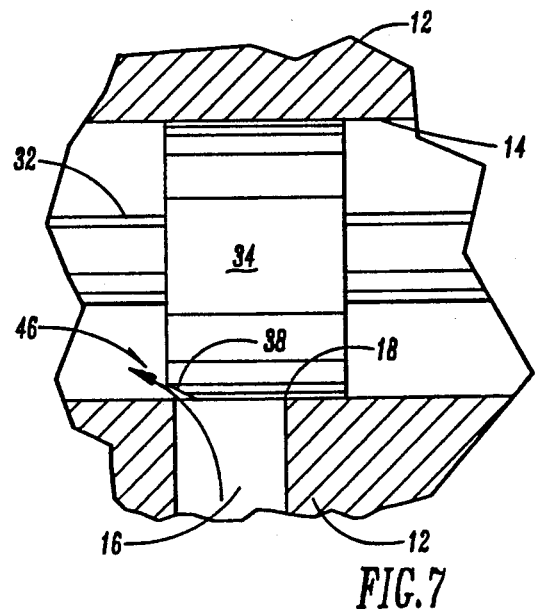
FIG. 7

SPOOL VALVE AND METHOD OF MAKING THE SAME

BACKGROUND OF THE INVENTION

Spool halves have long been used in the hydraulic arts and are generally comprised of a body member having a cylindrical bore therein with one or more hydraulic fluid ports intersecting with the bore. A valve plunger is slidably and rotatably mounted within the bore and has one or more cylindrical spools which serve to open or close the ports as the plunger is moved within the bore.

Some of the spool valves have spools with notches appearing on at least one peripheral edge thereof so as to allow hydraulic fluid to move through the notches as fluid moves between the bore and the ports. When the spools are positioned so that the notches slightly overlap the ports, the flow of fluid can be finely metered as the plunger delicately moves the spools to a position where the notches overlap the periphery of the port.

When the valve is of a construction to permit the plunger to be rotated, it is necessary to have an annular groove created within the bore and in communication with the port so that it can be assured that the notches will be in direct contact with fluid flow. Without the annular grooves, the device would operate only if the notches were in direct communication with the fluid port.

A further shortcoming of existing spool valves is that the notches therein are machined into the peripheral edges thereof, and this is time consuming and expensive.

It is therefore a principal object of this invention to provide a spool valve with spools therein which are adaptable for both rotational and/or slidable movement within the bore of the valve.

A further object of this invention is to provide a spool valve which has a notched spool therein which can successfully operate without the use of an annular groove within the bore of the valve which is in communication with the fluid port.

A still further object of this invention is to provide a method of placing notches in the spool of a spool valve that is inexpensive and which does not require machining.

These and other objects will be apparent to those skilled in the art.

SUMMARY OF THE INVENTION

The spool valve of this invention comprises a valve body with an elongated cylindrical bore therein, with one or more hydraulic ports in the valve body defined by fluid passageways extending through the body into communication with the bore. The intersection of the passage and the bore defines a peripheral port edge.

A cylindrical valve spool is slidably mounted in the bore and is adapted to slidably open and close the port with respect to the bore. Means is provided on the valve body for moving the valve in the bore.

The valve spool has a cylindrical outer surface and at least one planar end surface, with a peripheral metering edge being defined by the intersection therebetween. The peripheral metering edge of the spool has a plurality of tapered notches therein, at least some of which can overlap a portion of the peripheral port edge wherein the flow of hydraulic fluid between the bore and the passageway is metered through the notches that overlap the peripheral port edge.

The method of this invention creates the metering notches in the peripheral metering edges of the spools by positioning a knurling tool having a plurality of inverted and longitudinally straight V-shaped projections at an angle with respect to the longitudinal axes of the spool. The V-shaped projections on the knurling tool are placed in contact with the peripheral metering edge of the spool with sufficient force that the V-shaped projections will impress a tapered-shaped notch in the peripheral metering edge. The knurling tool and the cylindrical spool are rotated with respect to each other to create a plurality of tapered notches in the peripheral metering edge.

BRIEF DESCRIPTION OF THE DRAWINGS

FIG. 4 is an elevational view of a knurling tool impressing notches in the peripheral metering edge of the spool member of FIG. 2;

FIG. 5 is a sectional view through the knurling tool taken on line 5—5 of FIG. 4;

FIG. 6 is a partial sectional view of the peripheral port edge taken on line 6—6 of FIG. 1; and FIG. 7 is an enlarged scale sectional view similar to that of FIG. 1 but showing the spool member of FIG. 2 in an open metering position with respect to a hydraulic port.

DESCRIPTION OF THE PREFERRED EMBODIMENT

Figure 1:
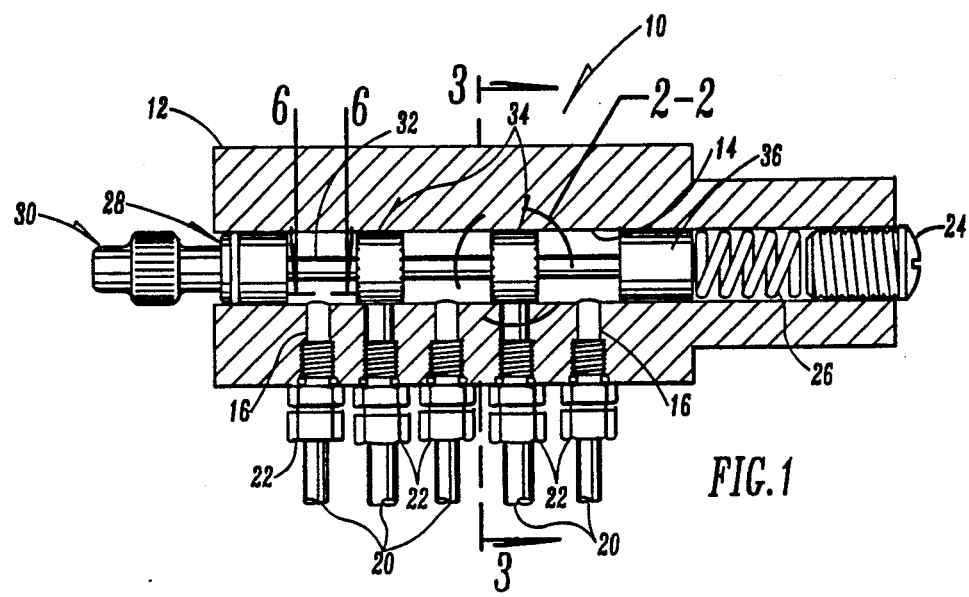
FIG. 1 is an elongated sectional view through the spool valve of this invention.

The valve assembly 10 is comprised of a valve body 12 having an elongated cylindrical bore 14 on its longitudinal axes. A plurality of radially positioned passageways 16 extend through the valve body 12 and intersect the elongated bore 14. The numeral 18 (FIG. 6) designates a peripheral port edge that is defined by the intersection of the bore 14 and the passageway 16. A plurality of hydraulic conduits 20 are connected to the passageway 16 by conduit fittings 22.

A threaded fitting 24 is threadably mounted in one end of bore 14. A spring in its expanded state is positioned within bore 14 adjacent fitting 24. A valve plunger 28 is slidably and rotatably mounted within bore 14 and is comprised of an end fitting 30, a valve rod 32, and one or more spaced valve spools 34 (FIG. 1). Suitable attachments can be secured to end fitting 30 to permit valve plunger 28 to be slidably moved and/or rotated within bore 14. A cylindrical plug 36 on the end of rod 32 opposite to end fitting 30 slidably embraces the interior of bore 14 and is adapted to engage the spring 26.

Figure 2:
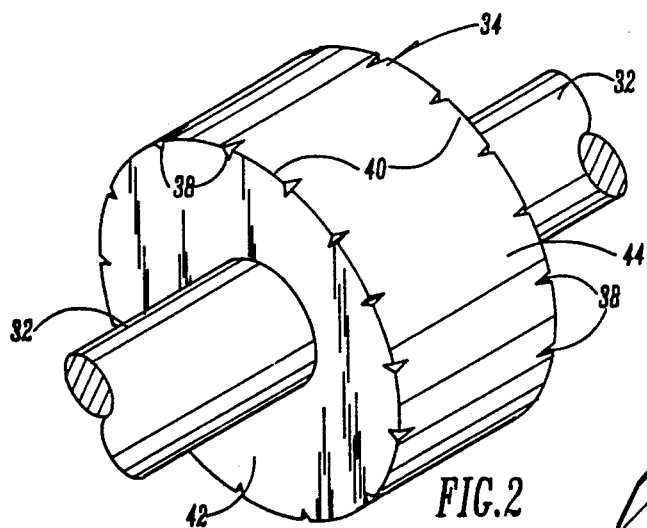
FIG. 2 is an enlarged perspective view of the spool member shown in elevation on lines 2—2 of FIG. 1.
Figure 3:
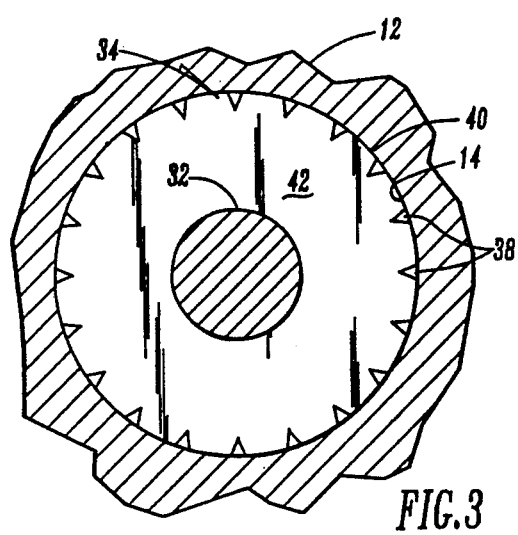
FIG. 3 is an enlarged scale sectional view taken on line 3—3 of FIG. 1.

As best shown in FIGS. 2 and 3, a plurality of spaced tapered notches 38 are formed in the peripheral metering edge 40 of spool 34. The peripheral metering edge 40 is defined by the intersection of the planar circular end surfaces 42 of spool 34 and the cylindrical land surface 44.

When the valve plunger 28 is moved from the position of FIG. 1 to a metering position as shown in FIG. 7, hydraulic fluid can move in the direction of arrow 46 from passageway 16 into bore 14 (or vice versa).

The method of this invention involves the creation of the tapered notches 38 which appear in the peripheral metering edge 40 of spools 34. Heretofore, such notches have been expensively machined. The present invention contemplates the placement of the spool 34 in a lathe. A conventional knurling tool 48 has a cylindrical body 50 with a plurality of straight longitudinally extending V-shaped projections which are preferably parallel with the longitudinal axes of the cylindrical body 50. The knurling tool is placed at an angle with respect to the longitudinal axes of the spool 34 so that at least one of the V-shaped projections 52 engages the peripheral metering edge 40. Normally, three identical knurling tools 48 are so positioned at 120° spacing around the peripheral metering edge 40. These knurling tools are free wheeling and are typically mounted on the conventional tool carrier of the lathe. The knurling tool is placed in tight engagement with the spool 34 as described above so that the V-shaped projection 52 in engagement with the peripheral metering edge 40 will penetrate the edge 40 to create the tapered V-shaped notch 38. As the spool is rotated, the knurling tool 48 will also rotate, and a series of tapered notches 48 will be formed in the metering edge 40.

This method contemplates that the material of spool 34 will be softer than that of the knurling tool 48.

This method is fast and efficient, and substantially reduces the cost of creating notches by means of machining or the like.

It is seen that the device of this invention, wherein a plurality of metering notches 38 are formed, will eliminate the need for the use of annular grooves in the bore of the valve as required by the prior art devices. By using a plurality of tapered notches, there is no need to index the rotation of valve plunger 28 to make sure that a V-shaped notch registers with the peripheral port edge 18 to permit fluid flow to take place because with a plurality of notches, at least one or more notches will always be registering with the ports when the valve is moved to the position shown in FIG. 7. From the foregoing, it is seen that this invention will achieve at least all of its stated objectives.

I claim:

1. A spool valve, comprising, a valve body having an elongated cylindrical bore defining a cylindrical shape free from annular or longitudinal grooves, a hydraulic port in said valve body defined by a peripheral port edge existing at the intersection of said bore and a passageway extending radially through said valve body and communicating with said bore, a cylindrical valve spool slidably mounted in said bore and adapted to be slidably moved to close and open said port with respect to said bore, means on a said body for moving said valve spool in said bore, said valve spool having a cylindrical land surface, and at least one end planar circular surface, with a peripheral metering edge defined by the intersection of said cylindrical land surface and said end planar surface, said peripheral metering edge having a plurality of tapered notches therein, at least some of which always overlap a portion of said peripheral port edge regardless of the rotational position of said cylindrical and surface with respect to said hydraulic port wherein the flow of hydraulic fluid between said bore and said passageway will be only through the tapered notches that overlap said portion of said peripheral port edge.

2. The spool valve of claim 1 wherein said valve spool has opposite end planar circular surfaces, and opposite peripheral metering edges having said tapered notches.

* * * * *